(12) United States Patent
Robb

(10) Patent No.: US 6,743,410 B2
(45) Date of Patent: Jun. 1, 2004

(54) PRIMARY REACTOR LIQUID WATER AND AIR INJECTION FOR IMPROVED MANAGEMENT OF A FUEL PROCESSOR

(75) Inventor: Gary M. Robb, Lima, NY (US)

(73) Assignee: General Motors Corporation, Detroit, MI (US)

(*) Notice: Subject to any disclaimer, the term of this patent is extended or adjusted under 35 U.S.C. 154(b) by 124 days.

(21) Appl. No.: 10/211,845

(22) Filed: Aug. 2, 2002

(65) Prior Publication Data

US 2004/0022724 A1 Feb. 5, 2004

(51) Int. Cl.[7] .................. C01B 3/26; G05D 7/00; B01J 8/02
(52) U.S. Cl. ............ 423/651; 252/373; 422/110; 422/111; 422/211
(58) Field of Search ............ 252/373; 422/110, 422/111, 211; 423/651, 652; 122/466, 483, 479.1

(56) References Cited

U.S. PATENT DOCUMENTS

| 4,464,444 A | 8/1984 | Mikawa ............... 429/13 |
| 4,585,708 A | 4/1986 | Abens et al. ............ 429/17 |
| 4,678,723 A | 7/1987 | Wertheim .............. 429/17 |
| 4,738,903 A | 4/1988 | Garow et al. .......... 429/17 |
| 4,865,926 A | 9/1989 | Levy et al. ............ 429/20 |
| 4,994,331 A | 2/1991 | Cohen ................... 429/17 |
| 5,221,586 A | 6/1993 | Morimoto et al. ...... 429/20 |
| 5,290,641 A | 3/1994 | Harashima ............ 429/17 |
| 5,935,726 A | 8/1999 | Chow et al. ........... 429/13 |
| 6,120,923 A | 9/2000 | Van Dine et al. ...... 429/17 |
| 6,444,179 B1 * | 9/2002 | Sederquist ............ 422/191 |

* cited by examiner

Primary Examiner—Stanley S. Silverman
Assistant Examiner—Maribel Medina
(74) Attorney, Agent, or Firm—Cary W. Brooks; Linda M. Deschere

(57) ABSTRACT

A method is provided to inject liquid water into the normal stream of fuel, superheated air and superheated steam entering a primary reactor of a fuel processor. The injection location is in the steam supply line where superheated steam vaporizes a majority of the liquid water, preferably prior to injection into the primary reactor. Steam supplied by a vaporizer may temporarily lag desired steam production due to system up-power transients or startup conditions, coupled with vaporizer thermal lag time. Injection of liquid water overcomes this temporary deficit of steam. Additional air is also supplied as needed to improve reactance for a given steam volume/temperature. Injection rate or volume of the liquid water and air may also be based on one or more measured variables of the primary reactor.

20 Claims, 4 Drawing Sheets

PRIMARY REACTOR LIQUID WATER AND AIR INJECTION FOR IMPROVED MANAGEMENT OF A FUEL PROCESSOR

FIELD OF THE INVENTION

This invention relates generally to a method for managing the operation of a fuel processor. More specifically, this invention relates to a method to inject liquid water, in combination with superheated steam and compressed air into the primary reactor of a fuel processor to support transient, startup and semi-continuous operation of the fuel processor.

BACKGROUND OF THE INVENTION

Hydrogen is used as a fuel in many applications today, including in fuel cells producing electric power. Fuel cells have also been proposed for use in electrical vehicular power plants to replace internal combustion engines.

In certain fuel cells, hydrogen ($H_2$) is the anode reactant, i.e., the fuel, and oxygen is the cathode reactant, i.e., the oxidant. The oxygen can be supplied in either a pure form ($O_2$), or as air (a mixture primarily containing $O_2$ and $N_2$). The hydrogen is typically provided by dissociating a hydrogen rich fuel.

For vehicular applications, it is desirable to use a liquid fuel such as methanol, gasoline, diesel, or the like, as the source of hydrogen for the fuel cell. Such liquid fuels for the vehicle are easy to store on board and there is a nationwide infracture for supplying liquid fuels. Such fuels must first be dissociated to release the hydrogen content thereof for fueling the fuel cell. The dissociation reaction is accomplished within a fuel processor, typically in several steps, including a fuel/air reaction (exothermic), and a fuel/water (as steam) reforming step (endothermic). Both these reactions often occur within the same component, known as an autothermal reformer, and herein as a primary reactor. The primary reactor typically yields a reformate gas comprising primarily of hydrogen and carbon monoxide. The carbon monoxide may then be further reacted with water in a water gas shift reactor and air in a preferential oxidation reactor to produce a reformate stream of sufficiently high quality for use in a proton exchange membrane (PEM) fuel cell. Output levels from the primary reactor directly impact all further downstream components. The optimum operating conditions for the primary reactor are dependent on the inlet temperature and steam to carbon ratio (S/C).

A general description of the primary reactor and water gas shift reactor, and the impact of water on their performance, are included below:

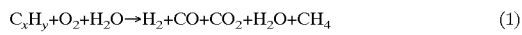

$$C_xH_y + O_2 + H_2O \rightarrow H_2 + CO + CO_2 + H_2O + CH_4 \quad (1)$$

$$CO + H_2O \leftrightarrows CO_2 + H_2 \quad (2)$$

$$CO + H_2 \leftrightarrows CH_4 + H_2O \quad (3)$$

As shown in equation (1), water is used as a source of oxygen (along with the air) for the incomplete oxidation of a hydrocarbon fuel. Water can also be found as a reactant and product in two secondary equilibrium reactions that can occur within the primary reactor. In the first of these secondary reactions (2), when water is used as a reactant (and is consumed within the reaction), decreasing its concentration (lowering the S/C ratio), will slow down the forward reaction, resulting in higher CO concentrations in the primary reactor exhaust. In the second of these secondary reactions (3), when water results as a product, decreasing its concentration (lowering the S/C ratio) will speed up the forward reaction resulting in higher methane ($CH_4$) concentrations in the primary reactor exhaust. Higher methane concentrations can be attributed to losses in efficiency with respect to primary reactor operation.

In a downstream water gas shift reactor (WGSR), steam is used for oxidation of carbon monoxide (CO). Water is used as a source of oxygen for the complete oxidation of CO in the primary reactor exhaust which feeds the WGSR. For the forward reaction, water is used as a reactant. Decreasing its concentration (lowering the S/C ratio) will slow down the forward reaction resulting in higher CO concentrations in the WGSR exhaust. All CO that exits the WGSR is normally fed to a preferential oxidation reactor (PrOx) wherein any remaining CO is oxidized to form $CO_2$. Any CO conversion in the PrOx is less efficient than in the WGSR because hydrogen is a product of CO oxidation in the WGSR, while hydrogen is consumed in the PrOx. Higher exiting CO concentrations can be attributed to losses in efficiency with respect to WGSR operation.

In order to increase efficiency, fuel processors often use heat generated within the process to heat other process streams. In many cases, steam can be generated and superheated by a number of different process streams within a fuel processor sub-system. During transient operations (i.e., where the power level is changing including startup and shutdown) an imbalance in the amount of heat needed with respect to the amount of heat available could be severe enough to create temporary deficiencies in the steam flow entering the primary reactor, where the initial breakdown of the fuel occurs. Steam deficiencies can cause disruptions in the expected product profile exiting the reactor which could further disrupt the balance of the system.

Superheated steam and air are together used to dissociate the raw fuel source in the primary reactor of a fuel processor to produce a reformate gas in a first step in producing the desired hydrogen output product. The steam is normally produced in a vaporizer. Normal variances in steam demand can be supplied by changing the water supply rate and/or heat input to the vaporizer. A deficiency exists, however, in that the vaporizer has a lag time between its steady state output of steam and its output following a system transient. This is due to the material and mass of the vaporizer, as well as its design efficiency of steam production for a given heat input.

During a transient event, the volume of steam in the primary reactor may lag the total volume necessary to maintain an optimum steam to carbon (S/C) ratio, due to a temporary heat imbalance between the existing and new operating levels, largely corresponding to the normal lag of the vaporizer. Accordingly, the vaporizer steam volume rate of change currently limits the rate of change of hydrogen production from the fuel processor during a transient. A method to enhance steam volume available in the primary reactor during transient and startup operation is therefore desirable.

A further system drawback exists during a startup phase. During this phase, system components must be preheated to normal operating temperature. Due to limits of heatup rate and total heat that can be withdrawn from a partially operating system, steam volume supplied by the vaporizer to the primary reactor may also be insufficient. An alternate source of water to supplement the steam for operation of the primary reactor is therefore desirable during the startup phase.

In addition to the above limitations, changing the volume of air supplied to the primary reactor produces differences in the reaction rate, and therefore the heat load developed by this exothermic (partial oxidation) reaction. Oxygen, normally provided by the air flow, is largely consumed in the initial or upstream stage of the primary reactor. Adjusting the air flow rate to the primary reactor at a time when steam volume in the primary reactor is reduced, or when the system is heating up, effects an oxygen to carbon (O/C) ratio. Up to an optimum point, increasing the air flow rate into the primary reactor can react an increased volume of fuel for a given volume of available steam. A method to control the air flow rate, separately or in concert with the steam (or liquid water) flow rate into the primary reactor, is therefore desirable during startup and transient operation of a fuel processor.

A method for managing the operation of a fuel processor to support transient, startup and semi-continuous operations is therefore desirable.

SUMMARY OF THE INVENTION

The above deficiencies and drawbacks are overcome by the method of the present invention. The preferred embodiment of the invention provides for injection of liquid water into the normal stream of steam entering the primary reactor of a fuel processor. Liquid water is injected into the steam supply line to overcome a temporary deficit of steam supplied by the vaporizer to the primary reactor. During up-power transients, the volume of steam entering the primary reactor may lag the total volume necessary. To correct the lag in total steam volume during this transient, and therefore to maintain a constant S/C ratio, liquid water from a local water source is injected directly into the steam supply line.

The primary reactor inlet steam temperature is usually in the superheated steam temperature range, and would therefore contain sufficient thermal energy to vaporize and superheat the anticipated volume of liquid water to be injected. The liquid water can be injected in a variety of forms, exemplary forms including water stream, water spray such as through an orifice, or as atomized particles. Liquid water injection provides instantaneous control of the steam volumetric flow, and thus control of the S/C ratio of the primary reactor during those times where steam deficits exist in the system.

In order to control the supplemental water flow rate, knowledge of the desired steam flow rate as well as the steam flow exiting the vaporizer is required. The desired steam flow rate is a constraint of the system in order to maintain a constant S/C ratio. The desired S/C ratio is based on the system design which takes into account many predetermined factors including system pressure, primary reactor operating temperature, water gas shift reactor sizing, fuel properties, humidification requirements, and others. Assuming the predetermined factors are given, the only input required to control the supplemental water flow is the steam flow exiting the vaporizer.

In the preferred version of the invention, a method of operating a primary reactor in a fuel processing system is provided, the method comprising the steps of generating a superheated steam stream; selectively injecting a water stream into said superheated steam stream to form a steam stream mixture; introducing said steam stream mixture to an inlet of a primary reactor; providing a hydrocarbon fuel stream to said inlet of said primary reactor; connecting an air stream to said inlet of said primary reactor; dissociating said steam stream, said fuel stream and said air stream in said primary reactor to form a hydrogen-containing reformate, wherein said water stream is selectively injected into said superheated steam stream based on an operating state of said primary reactor.

When liquid water is added to a stream containing vaporized or superheated water, the temperature of the stream will be lowered due to the sensible heat and latent heat of vaporization of the supplemental water. For a given S/C ratio, there exists a relationship between the inlet mixture temperature and the O/C ratio required to maintain optimum efficiency. Compensation for the inlet mixture temperature decrease can be made by increasing the air flow rate (increasing the O/C ratio) in the inlet flow stream to the primary reactor to maintain a constant outlet temperature. For a given S/C ratio, the outlet temperature has the largest influence over the equilibrium methane concentration exiting the primary reactor, and thus the efficiency.

In a further aspect of the present invention, during those times when steady or continuous liquid water injection is necessary to maintain a constant, or optimum S/C ratio, or a greater volume of liquid water is injected than the superheated flow of steam has the heat capacity to superheat, increasing the heat output of the primary reactor, by its exothermic reaction, can provide additional heat input in the primary reactor to replace heat lost by the continuous injection of relatively colder liquid water. In this aspect, the primary reactor heat load, and the O/C ratio can be controlled by adjusting the air flow rate to the primary reactor. Increasing the air flow rate increases the partial oxidation dissociation rate of the primary reactor, an exothermic reaction, thereby increasing the heat produced by the primary reactor, which can be used to superheat an increased steam volume and further improve reformate gas production.

In this further aspect of the invention, a method of operating a primary reactor in a fuel processing system over a semi-continuous time period to produce a hydrogen-containing reformate from a hydrocarbon fuel is provided, the method comprising the steps of supplying a first stream having a superheated steam to an inlet of the primary reactor; injecting a second stream having liquid water into said first stream; adding a third stream having a preheated fuel to the primary reactor inlet, for dissociation in the primary reactor; introducing a fourth stream having pressurized air to the primary reactor inlet; determining at least one threshold of liquid water volumetric flow above which an increased reaction heat of the primary reactor is required; and controlling a flow rate of the pressurized air to provide the increased reaction heat of the primary reactor.

In yet another aspect of the invention, a superheated air injection rate will be based on the inlet temperature of the primary reactor. Normally, a liquid water injection rate, provided to supplement a transient operation, will decrease gradually over time as the vaporizer heat lag diminishes. If measurement of the primary reactor inlet temperature indicates additional heat input in the primary reactor is required, superheated air can be added to the flowstream upstream of the primary reactor to increase the dissociation rate (an exothermic reaction) of the fuel source, thus increasing the heat load of the primary reactor.

In this aspect of the invention, a method of operating a primary reactor in a fuel processing system to produce a hydrogen containing reformate from a hydrocarbon fuel is provided, the method comprising the steps of supplying a first stream having a superheated steam to an inlet of the primary reactor; injecting a second stream having liquid water into said first stream, during a predetermined operating condition, to vaporize at least a majority of the liquid water in a liquid water/superheated steam mixture prior to the mixture reaching the primary reactor inlet; adding a third stream having a preheated fuel to the primary reactor inlet, for dissociation in the primary reactor; introducing a fourth stream having pressurized air to the primary reactor inlet; measuring an inlet temperature of the primary reactor; and controlling a net flow to the primary reactor, said net flow being a combination of the first, second, third and fourth streams to the primary reactor, based on the measured inlet temperature of the primary reactor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The various features, advantages and other uses of the present invention will become more apparent by referring to the following detailed description and accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
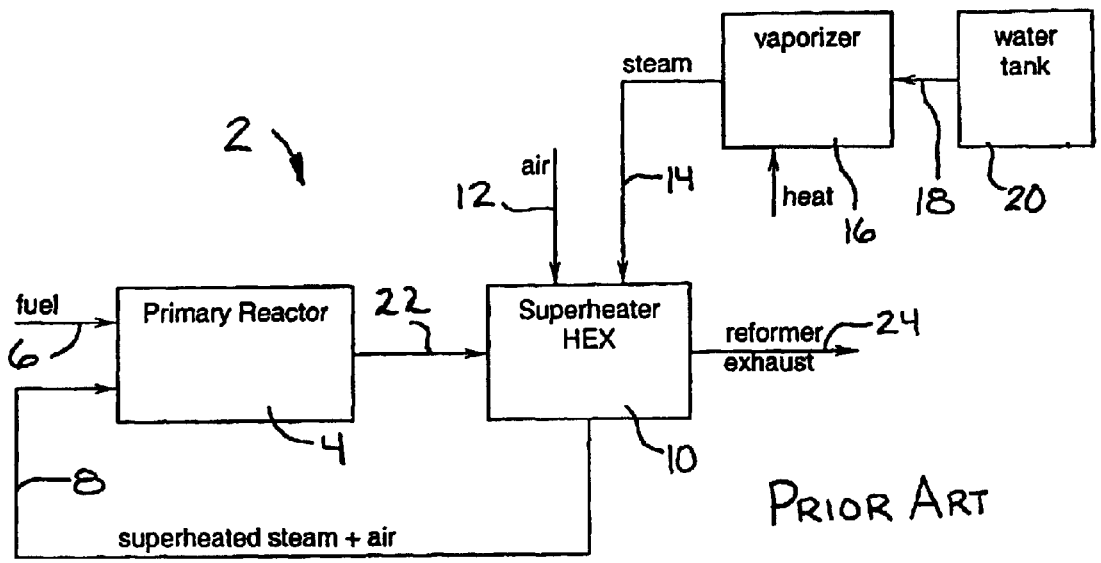
FIG. 1 is a block diagram of a primary reactor portion of a known fuel processor system.

Referring to FIG. 1, a conventional primary reactor feed exhaust block diagram is provided. As shown in FIG. 1, a reforming system 2 includes a primary reactor 4. Primary reactor 4 is an auto thermal reformer, wherein partial oxidation and steam vaporization of a fuel supplied to the primary reactor 4 take place. Fuel to the primary reactor 4 is provided through fuel line 6. A combination of superheated steam and air are provided to the inlet side of primary reactor 4 by superheated steam/air line 8. Upstream of superheated steam/air line 8 is a superheater 10. Compressed air is supplied to superheater 10 through compressed air line 12. Steam is also provided to superheater 10 via steam line 14. The steam in steam line 14 is generated in vaporizer 16 which is supplied by water line 18 and upstream water tank 20. Water in water tank 20 is normally preheated and re-supplied to water tank 20 via reuse lines (not shown) from the fuel processor. The air and steam are mixed within the superheater 10 and exhausted through superheated steam/air line 8.

The combination of fuel, superheated air and superheated steam provided to primary reactor 4 produce a reformate gas. The reformate gas exits the primary reactor via primary reactor outlet line 22. Primary reactor outlet line 22 supplies superheater 10 where heat is transferred to the air and steam passing through the backside of the superheater 10. The reformate gas is partially cooled and exhausts the superheater via superheater outlet line 24. Superheater outlet line 24 provides flow to further downstream components of the fuel processor, which may include a water gas shift reactor and/or preferential oxidation reactor (not shown).

Figure 2:
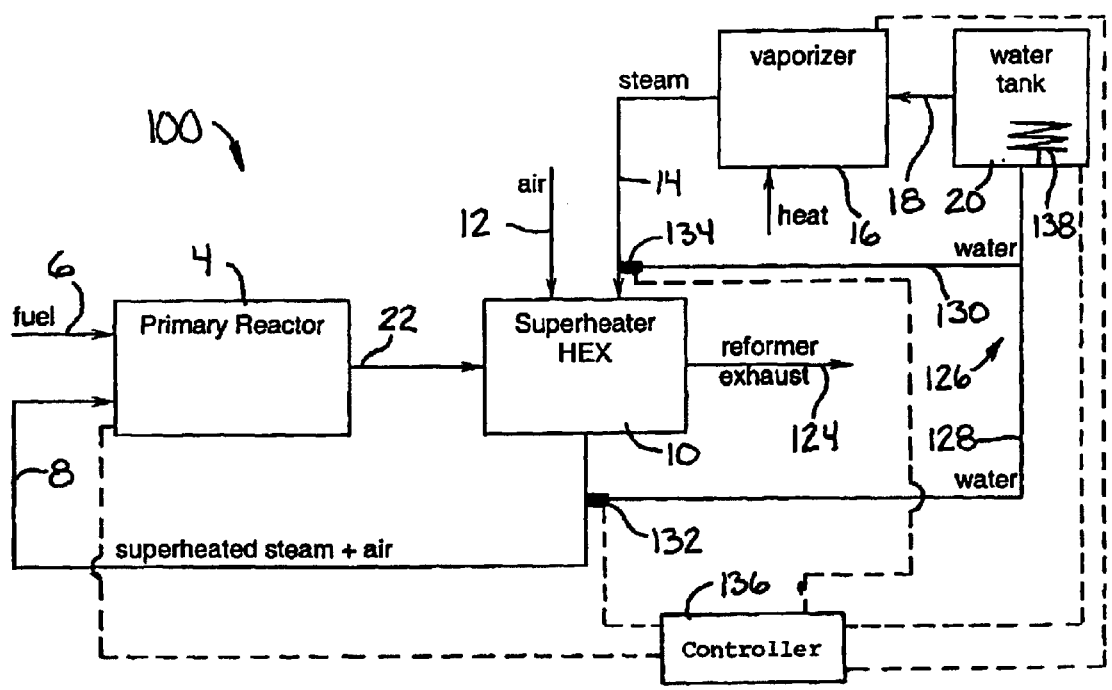
FIG. 2 is a block diagram of the fuel processor system incorporating the method of liquid water injection of the present invention.

Referring now to FIG. 2, a primary reactor feed and exhaust block diagram utilizing water injection of the present invention is shown. Components common to FIG. 1 are identified with the same numbers as FIG. 1 and will not be described further herein.

FIG. 2 shows a reforming system 100 including a water supply system 126 having downstream water line 128, and upstream water line 130, and water injectors 132, 134 in addition to the components of the reforming system 2. In reforming system 100 water can be supplied directly from water tank 20 to the superheated steam/air line 8 via water injector 132. Water injector 132 is located in superheated steam/air line 8 sufficiently far upstream from the inlet to the primary reactor 4 to permit the temperature of the superheated steam/air mixture to vaporize at least a majority of the water injected through downstream water line 128. Optionally, water from water tank 20 may be injected into steam line 14 downstream of vaporizer 16 and upstream of superheater 10. Injection through upstream water line 130 may be used during periods when superheater 10 is coming up to temperature or during other operations when additional water from water tank 20 is required to be vaporized prior to reaching the inlet of primary reactor 4.

Injection water from water tank 20 is provided through downstream water line 128 or upstream water line 130 in order to supplement steam flow from vaporizer 16 to primary reactor 4. A variety of means may be used for injectors 132, 134 including orifices, control valves and throttle plate designs to introduce water via downstream water line 128 or upstream water line 130 to either provide liquid water flow, vaporized water flow or atomized water flow into superheated steam/air line 8 or steam line 14. The term water injection used herein applies to any such form of water introduction.

As described herein, it is anticipated that there may be operating conditions wherein liquid water injection and air injection are also provided over a continuous time period. This situation may occur when optimization of system flow rates and reformate production indicates that additional flow of water and/or air is required to improve the overall efficiency of the fuel processor reforming system 100.

Known data concerning the water temperature of water tank 20, the parameters of vaporizer 16, and the operating conditions of primary reactor 4 may be employed in order to control additional flow of liquid water and/or air into primary reactor 4. Overall water concentration, either as steam or as injected water, is controlled in order to maintain the output of primary reactor 4 Controller 136 is operably coupled to fuel reforming system 100 to receive control signals from primary reactor 4, vaporizer 16 and water tank 20. Such control signals are used by controller 136 to control water injectors 132, 134.

Normally, the water in water tank 20 is returned for reuse from within the fuel cell system and is typically in the temperature range of about 60° C. to 70° C. Water tank 20 may also include a suitable preheater 138 in order to further preheat water in water tank 20. Under certain transient up-power or startup conditions, the heat capacity of the stream of superheated steam/air line 8 may be insufficient to vaporize all of the water that is added. Additionally, the previously described lag of the vaporizer 16 in producing sufficient heat to vaporize all of the water from water tank 20 into steam line 14 will result in conditions of insufficient steam volume in primary reactor 4. In order to further increase the reactance of primary reactor 4, additional compressed air may be injected into primary reactor 4 via superheater 10 through compressed air line 12. The initial partial oxidation of the fuel entering through fuel line 6 into primary reactor 4 can be increased by increasing the amount of air flow into system 100. A given steam requirement may actually decrease upon increasing the volume of air into primary reactor 4. Increasing the demanded air flow rate through compressed air line 12 may be conducted for a variety of water flow rates. Additional air flow may not be required for all situations where liquid water flow is injected into superheated steam/air line 8 or steam line 14. Additional air flow can be provided based on a threshold value of injected water volume. It is expected that larger transients will result in the need for additional air flow into primary reactor 4.

Figure 3:
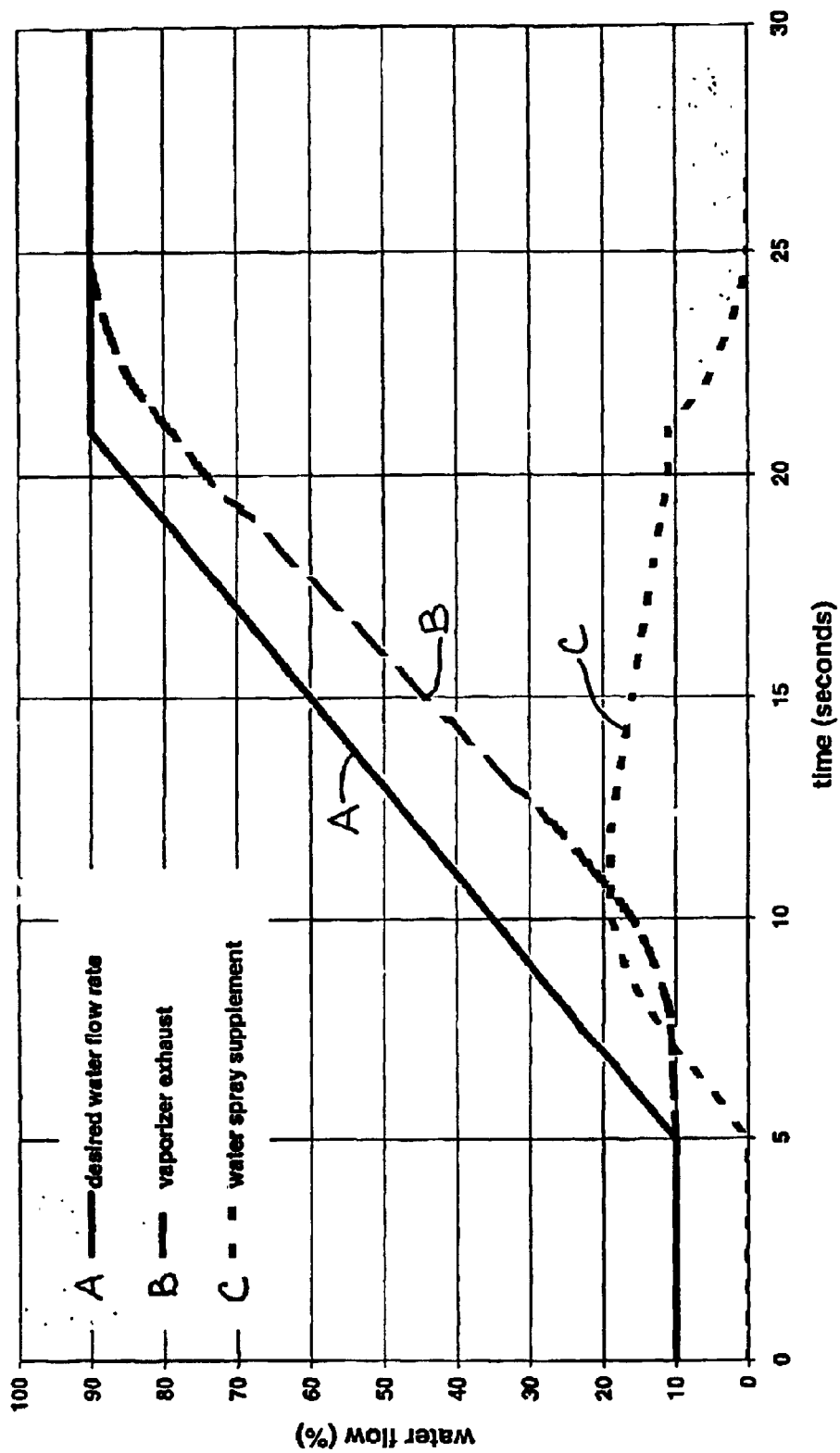
FIG. 3 is a graph of an exemplary rate of liquid water injection over a transient time period.

Referring to FIG. 3, a graph of an exemplary rate of liquid water injection (% water flow) over a time period for a transient event commenced at 5 seconds is given. As shown in FIG. 3, the rate of liquid water injection should initially rapidly increase from about 5–10 seconds followed by a slow, more gradual decline from about 10–25 seconds as the heat load of vaporizer 16 gradually changes from the pre-transient to the post-transient operating temperature. It is evident that a variety of graphs similar to FIG. 3 can be identified, therefore FIG. 3 is exemplary of only one set of conditions, including vaporizer mass, vaporizer heat transfer rate and primary reactor reactant rate.

FIG. 3 provides an exemplary total water flow rate of ten (10) percent as an initial system operating condition from time zero to time of five seconds. At the five second time mark, a system up-power transient is begun. In this example, from time 5 seconds to time 20 seconds, total system water flow (as steam) should optimally increase along solid curve A from 10 percent flow to 90 percent flow (the new system flow rate). Based on the lag time of the vaporizer 16, vaporizer exhaust, shown as long dashed curve B in FIG. 3, is significantly delayed between time 5 seconds and about time 12 seconds, below the desired water flow rate of curve A. From time 12 seconds to about time 22 seconds, the vaporizer meets or exceeds the total flow rate of water required to match the desired flow rate, however, a net imbalance of actual to desired water flow exists between time 5 seconds and time 24 seconds.

The short dashed curve C of FIG. 3 represents the use of water injection to correct the imbalance described above in accordance with the present invention. As shown in FIG. 3, starting at time 5 seconds, or the start of the transient, additional water is injected as shown by curve C at a rate equaling the desired water flow rate between time 5 seconds and about 8 seconds, when the vaporizer has not yet begun to react to the transient. Between time about 8 seconds and the end of the transient at time 20 seconds, (defined here as the system achieving a 90 percent flow rate), the water injection rate indicated by curve C quickly peaks at about time 10 seconds and slowly reduces, providing supplemental water flow to permit a system response to the transient approximating the desired water flow rate (curve A), and providing the new 90 percent water flow rate at time about 22 seconds. As evident, a delay of several seconds in vaporizer response requires that supplemental water be injected as shown by curve C, after the desired rate (i.e., 90%) of total water flow to the primary reactor 4 has been achieved (i.e., at about time 22 seconds). Therefore, water injection continues from time about 22 seconds to time about 24 seconds, when the vaporizer alone can provide the new system 90% flow rate.

Figure 4:
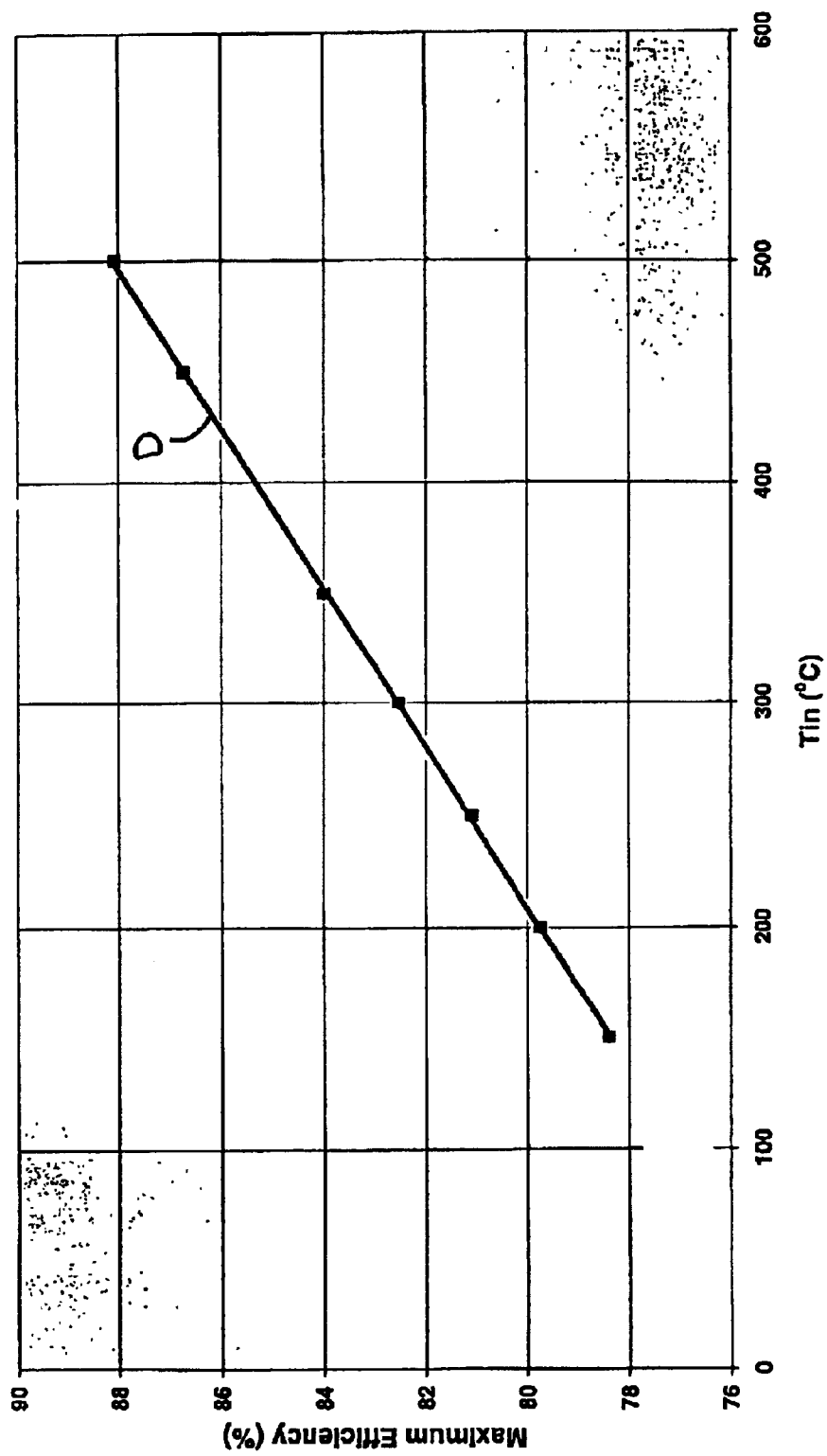
FIG. 4 is a graph depicting an exemplary correlation of system maximum efficiency versus primary reactor inlet temperature.

Referring to FIG. 4, a graph depicting an exemplary correlation of maximum efficiency versus inlet mixture temperature of primary reactor 4 is shown. Here, efficiency is defined as the ratio of the lower heating value of hydrogen and carbon monoxide exiting the primary reactor to the lower heating value of fuel being fed to the primary reactor. FIG. 4 assumes a constant steam to carbon (S/C) ratio. The lowest system efficiency of about 78.5% occurs at a primary reactor inlet temperature of about 150° C. As shown by curve D, if the S/C ratio can be maintained constant, system efficiency increases about linearly to a maximum of 88% at an inlet temperature of about 500° C. FIG. 4 exemplifies that maintaining the highest inlet temperature to the primary reactor 4, through any combination of increasing steam volume or air volume, results in increased overall efficiency.

Figure 5:
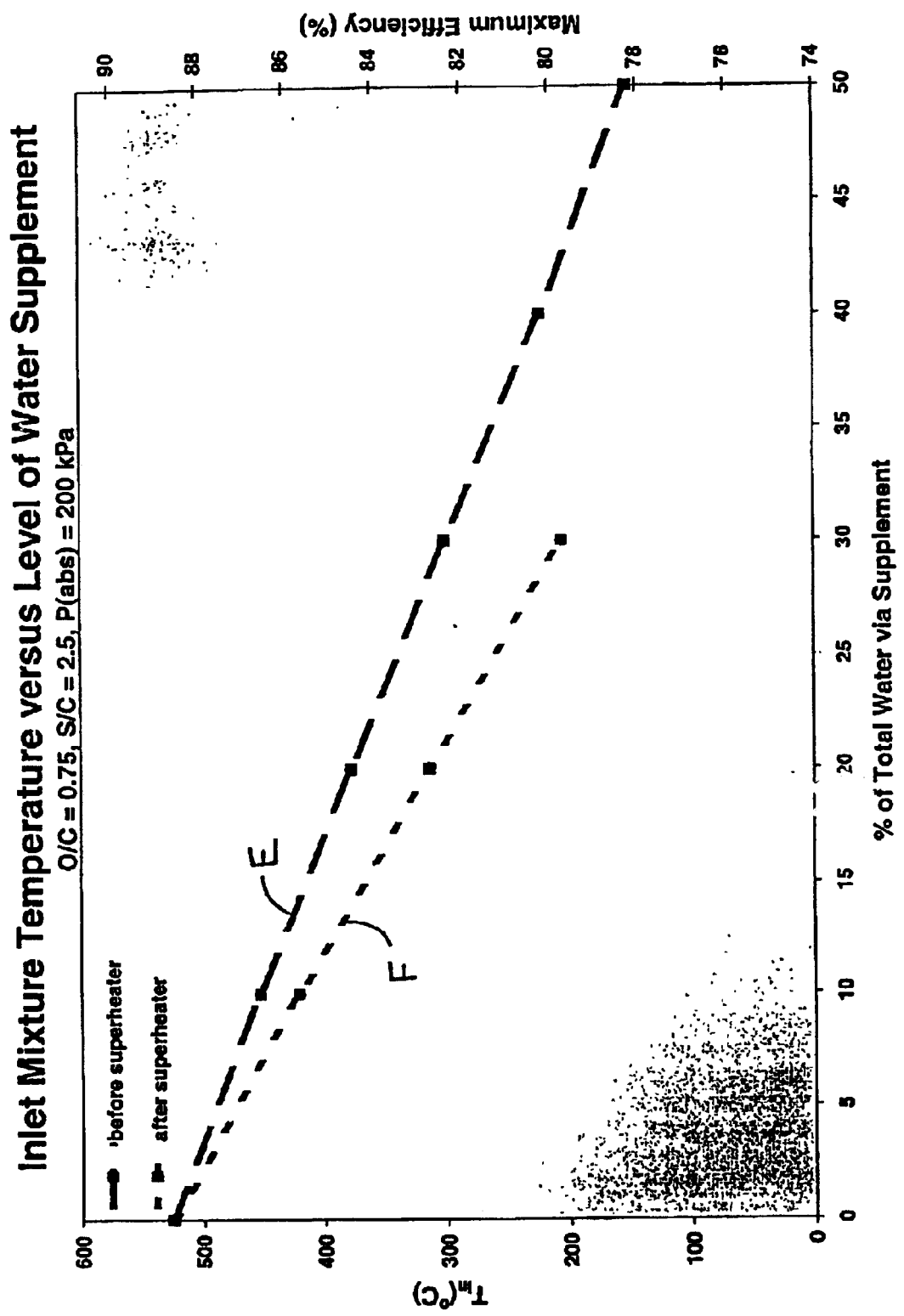
FIG. 5 is a graph depicting an exemplary correlation of primary reactor inlet mixture temperature versus percentage of total water injected via supplemental injection, and the subsequent impact of increasing water injection on processor efficiency.

Referring now to FIG. 5, a graph depicting an exemplary correlation of primary reactor inlet mixture temperature versus percentage of total water injected via supplemental injection, and the impact of increasing water injection on processor efficiency is shown. In FIG. 5, dashed curve E represents the system response when water injection is performed upstream of superheater 10, i.e., via upstream water line 130 of FIG. 2. Dotted curve F represents the system response when water injection is performed downstream of superheater 10, i.e., via downstream water line 128 of FIG. 2. The volume of water injection is identified in FIG. 5 as a percentage of overall water flow to the primary reactor 4. The impact of increasing the net volume of relatively colder injection water into the primary reactor 4 from 0% of total water flow to about 50% of total water flow is shown. As expected, inlet mixture temperature drops as a result of adding relatively colder injection water, from a maximum temperature of about 525° C. with no injection flow, to a minimum temperature of about 170° C. at 50% injection flow (curve E). System efficiency drops from a maximum of about 88% with no water injection (i.e., all steam flow), to a minimum of about 78% with 50% water injection by volume.

The description of the invention is merely exemplary in nature and, thus, variations that do not depart from the gist of the invention are intended to be within the scope of the invention.

The primary reactor 4 as referred to herein may comprise one or more catalytic beds. Where more than one catalytic bed is employed, the preferred design is a sequential arrangement of beds, such that the outlet from one bed enters the inlet of the next bed. This and other configurations of catalytic beds may be used without departing from the spirit and scope of the invention.

Various components of a control system may be employed without departing from the spirit and scope of the invention. These may comprise any combination of hardware and/or software suitable to provide control of the flow of steam, fuel, water and air as described herein. It is anticipated that a combination comprising software having known properties of the components and operating parameters of the particular fuel processor design programmed therein, together with appropriate hardware and necessary control valves/flow control devices, will be employed to implement the method of the present invention. The choice of components or program methodology may be varied without departing from the spirit and scope of the invention.

An advantage of the present invention method is to provide control of the primary reactor temperature, improved overall production of reformate gas from the primary reactor, and increased steam volume in the fuel processor during transient operation. Further, the method of the present invention provides for the ability to maintain a constant steam to carbon ratio, and to reduce the occurrences of carbon carryover/buildup in the primary reactor and therefore to the downstream components of the fuel processor.

What is claimed is:

1. A method of operating a primary reactor in a fuel processing system, the method comprising the steps of:
    generating a superheated steam stream;
    selectively injecting a water stream into said superheated steam stream to form a steam stream mixture;
    introducing said steam stream mixture to an inlet of a primary reactor;
    providing a hydrocarbon fuel stream to said inlet of said primary reactor;
    connecting an air stream to said inlet of said primary reactor;
    dissociating said steam stream, said fuel stream and said air stream in said primary reactor to form a hydrogen-containing reformate, wherein said water stream is selectively injected into said superheated steam stream based on an operating state of said primary reactor.

2. The method of claim 1 which comprises the further step of reducing injection of the water stream to a zero flow over a predetermined time period.

3. The method of claim 1 which comprises the further steps of:
    preheating a source of the air stream;
    pressurizing the source of the air stream; and
    providing the preheated, pressurized air stream to the primary reactor inlet.

4. The method of claim 3 which comprises the further step of introducing a volumetric flow of said preheated, pressurized air stream to increase a rate of heat generation by the primary reactor.

5. The method of claim 1 which comprises the further step of preheating a source of said liquid water stream prior to injecting said liquid water stream into the superheated steam stream.

6. The method of claim 1 which comprises the further step of injecting said liquid water stream at a pre-selected spaced location in the first inlet stream, said location spaced from the primary reactor to permit the superheated steam stream to superheat at least a majority of a liquid water in the steam stream mixture prior to the mixture reaching the primary reactor inlet.

7. The method of claim 1 which comprises the further step of preheating a source of said hydrocarbon fuel stream prior to introducing said fuel stream into the inlet of said primary reactor.

8. A method of operating a primary reactor in a fuel processing system to produce a hydrogen containing reformate from a hydrocarbon fuel, the method comprising the steps of:
    supplying a first stream having a superheated steam to an inlet of the primary reactor;
    injecting a second stream having liquid water into said first stream, during a predetermined operating condition, to vaporize at least a majority of the liquid water in a liquid water/superheated steam mixture prior to the mixture reaching the primary reactor inlet;
    adding a third stream having a preheated fuel to the primary reactor inlet, for dissociation in the primary reactor;
    introducing a fourth stream having pressurized air to the primary reactor inlet;
    measuring an inlet temperature of the primary reactor; and
    controlling a net flow to the primary reactor, said net flow being a combination of the first, second, third and fourth streams to the primary reactor, based on the measured inlet temperature of the primary reactor.

9. The method of claim 8 which comprises the further step of temporarily increasing a flow of the pressurized air to the primary reactor to increase a primary reactor reaction temperature for vaporizing an unvaporized remainder of the liquid water/superheated steam mixture reaching the primary reactor inlet.

10. The method of claim 8 which comprises the further step of adding the pressurized air over a continuous time period to control an oxygen/carbon (O/C) ratio and an outlet temperature of the primary reactor.

11. The method of claim 8 which comprises the further step of controlling a volumetric flow rate of said fourth stream of pressurized air to the primary reactor inlet to increase an oxygen/carbon (O/C) ratio.

12. The method of claim 9 which comprises the further step of adding a volumetric flow of the liquid water over a predetermined time period to increase a steam/carbon (S/C) ratio.

13. A method of operating a primary reactor in a fuel processing system over a semi-continuous time period to produce a hydrogen-containing reformate from a hydrocarbon fuel, the method comprising the steps of:
    supplying a first stream having a superheated steam to an inlet of the primary reactor;
    injecting a second stream having liquid water into said first stream;
    adding a third stream having a preheated fuel to the primary reactor inlet, for dissociation in the primary reactor;
    introducing a fourth stream having pressurized air to the primary reactor inlet;
    determining at least one threshold of liquid water volumetric flow above which an increased reaction heat of the primary reactor is required; and
    controlling a flow rate of the pressurized air to provide the increased reaction heat of the primary reactor.

14. The method of claim 13 which comprises the further step of controlling a volumetric flow of the liquid water injected during the semi-continuous time period to optimize a steam/carbon (S/C) ratio.

15. The method of claim 13 which comprises the further step of temporarily increasing the reaction heat of the primary reactor by increasing the flow rate of the pressurized air to adjust an oxygen/carbon (O/C) ratio.

16. The method of claim 13 which comprises the further step of temporarily increasing the reaction heat of the primary reactor by increasing the flow rate of the pressurized air to adjust an outlet temperature of the primary reactor.

17. A fuel processing system for reforming a hydrocarbon fuel comprising
    a primary reactor having a reactor inlet and a reactor outlet;

a superheater including a first portion having a first inlet, a second inlet, and a first outlet in fluid communication with said inlet of said primary reactor, and a second portion having a third inlet in fluid communication with said reactor outlet;

a source of pressurized air in fluid communication with said second inlet;

said superheater generating a superheated steam and air stream at the first outlet; and a water supply system including a source of water in fluid communication with said first inlet, an injector in fluid communication with said first outlet, and a controller coupled to said injector for selectively injecting water into said superheated steam and air stream based on an operating state of said primary reactor.

18. The fuel processor system of claim 17, further comprising a vaporizer interconnectably joining said source of water to said superheater, said vaporizer having a vaporizer inlet in fluid communication with said source of water, a vaporizer outlet in fluid communication with said first inlet, and a source of heat, said vaporizer receiving said source of water and utilizing said source of heat for generating a steam stream which is introduced into said first inlet.

19. The fuel processor system of claim 18, further comprising a second injector in fluid communication with said first inlet and said water source, said second injector coupled to said controller for selectively injecting water into said steam stream based on an operating state of said primary reactor.

20. The fuel processor of claim 17, wherein said source of water is preheated.

* * * * *